Jan. 25, 1955 J. E. WALDEN 2,700,402
BAND SAW ATTACHMENT FOR CIRCULAR SAW TABLES
Filed Aug. 13, 1953 2 Sheets-Sheet 2
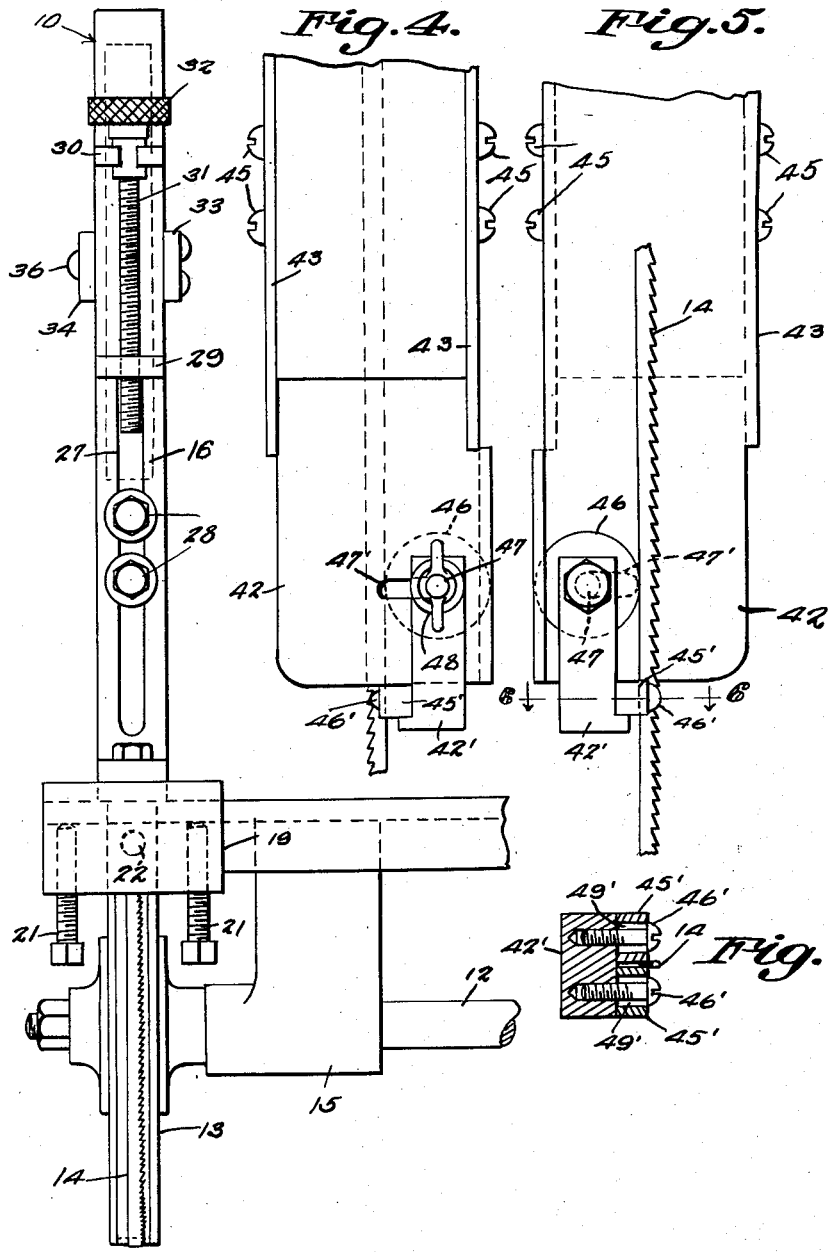
J. E. Walden
INVENTOR
BY C. A. Snow & Co.
ATTORNEYS.

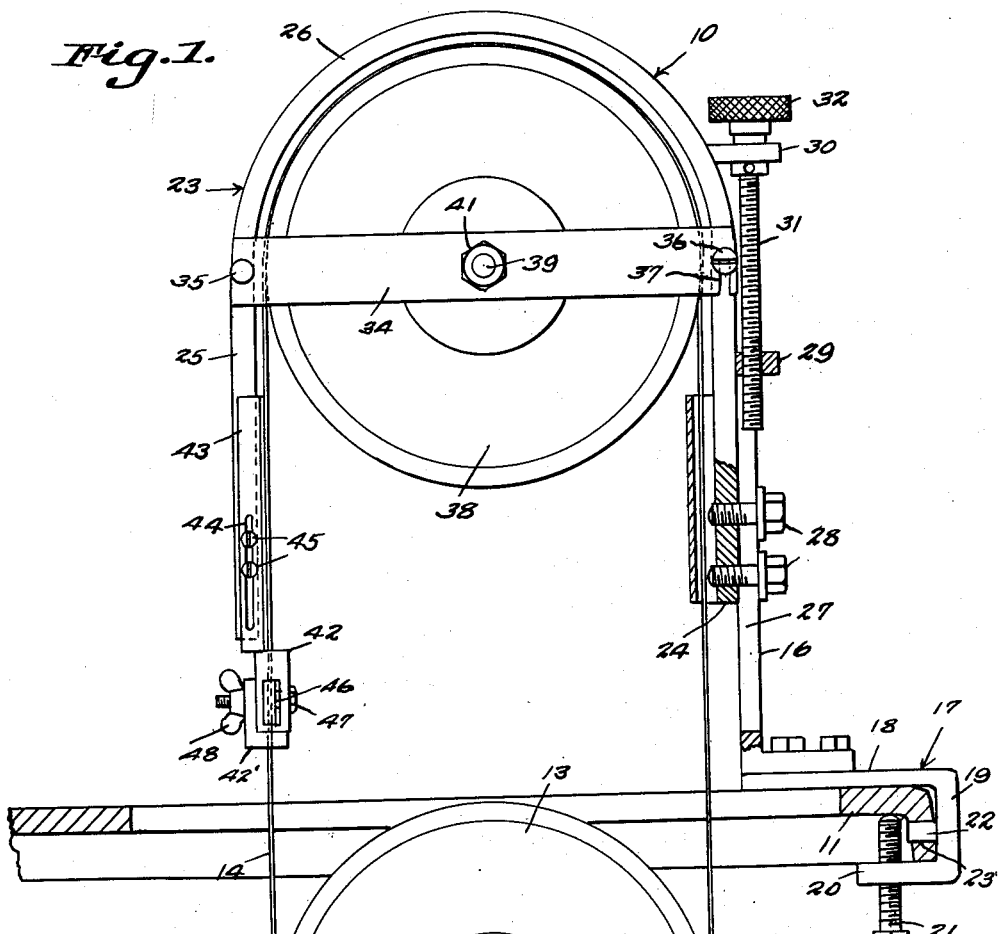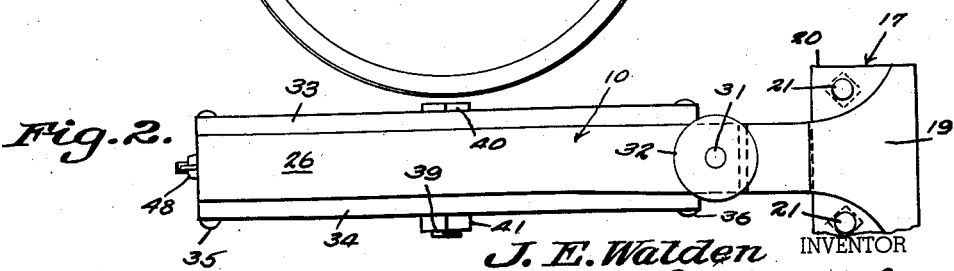

United States Patent Office 2,700,402
Patented Jan. 25, 1955

2,700,402

BAND SAW ATTACHMENT FOR CIRCULAR SAW TABLES

Jesse E. Walden, Alexandria, Va.

Application August 13, 1953, Serial No. 373,991

2 Claims. (Cl. 143—17)

By way of explanation, it might be stated that the cost of providing various types of power saws, particularly for use in woodworking shops operated as a hobby, is frequently prohibitive.

Then too, because of the restricted space in the usual shop of the character, it is impossible to install several power machines such as a circular saw, band saw, drills or the like.

It is therefore the primary object of the invention to provide a band saw unit which may be releasably clamped to a circular saw table, the band saw unit being so constructed and arranged that the power of the circular saw may be used as the power for the attached band saw unit for operating the same.

An important object of the invention is to provide a band saw attachment unit for clamping engagement with a saw table of a circular saw, wherein the circular saw may be easily removed from the powered rotary spindle and easily replaced by a pulley for application of the band saw.

Another object of the invention is to provide a band saw unit for attachment to a circular saw table, to the end that the circular saw table may be readily and easily transformed into a band saw table for supporting the band saw, thus saving the space and cost of a saw table for each of the saws.

Still another object of the invention is to provide a band saw attachment for circular saw tables, the unit being constructed so that adjustment of the band saw as is required for any one of the several different sized band saws now in use, may be readily made.

With the foregoing and other objects in view which will appear as the description proceeds, the invention consists of certain novel details of constructions and combinations of parts hereinafter more fully described and pointed out in the claims, it being understood that changes may be made in the construction and arrangement of parts without departing from the spirit of the invention as claimed.

Referring to the drawings:

Fig. 1 is a side elevation of one side of the band saw attachment constructed according to an embodiment of this invention.

Fig. 2 is a top plan view.

Fig. 3 is a front elevation of the right side of the band saw attachment shown in Fig. 1 of the drawings.

Fig. 4 is a side view of an exploded elevation of the left side of the attachment shown in Fig. 1 of the drawings.

Fig. 5 is an enlarged and exploded elevation of the left side of the attachment, looking outwardly and to the left in Fig. 1 of the drawings.

Fig. 6 is a detailed cross sectional view of a portion of the attachment taken on the line 6—6 of Fig. 5.

Referring to the drawings in detail, the numeral 10 designates generally a band saw attachment for a top 11 of a conventional circular saw. In the ordinary sawing operation of a length of wood, a circular saw not shown in the drawings is frequently used, and a saw table is provided as a part of such circular saw.

Frequently when sawing material, it becomes necessary to use a band saw. By using one saw table as a circular saw table with a circular saw and adapting that saw table for use with a band saw, a considerable saving in space for the saws, is effected, and a considerable saving in the cost of supplying a band saw results.

When such a change is desired the circular saw may be removed from its arbor 12 on which it is normally secured, to be replaced by a wheel or pulley 13 as clearly shown in Fig. 1 of the drawings.

The pulley or wheel as secured on the arbor 12 has a flat circumferential surface for engagement with a saw band 14 when the wheel 13 and the saw band 14 are used to replace a circular saw.

The arbor 12 is power rotated and forms an extension of a motor not shown, the arbor 12 operating in the bearing 15 supported by the saw table as better shown by Fig. 3 of the drawings.

The band saw attachment 10 includes an upstanding arm 16 having the lower end thereof secured to a clamp 17 which is clampingly engaged with the table top 11. The clamp 17 includes a horizontally extending arm 18 having a depending arm 19 secured to or formed integral with one end of the horizontal arm 18 and a second horizontal arm 20 formed integral with the lower end of the depending arm 19 parallel with the horizontal arm 18. A screw 21 is threadedly engaged through the second horizontally extending arm 20 and one end of the screw 21 is adapted to engage the lower surface of the table top 11 while the second horizontally extending arm 18 will engage the upper surface of the table 11 for clamping the table between the horizontally extending arms 18 and 20 as clearly shown in Fig. 1 of the drawings. The vertically extending upstanding arm 16 may be bolted to the free end of the horizontally extending arm 18 or otherwise secured thereto.

A horizontally extending locating pin 22 is fixed on or secured to the vertically extending arm 19 between the horizontally extending arm 18 and 20 for locating engagement in a hole 23', or other locating opening in the wall 11 for properly locating the band saw attachment 10 on the table 11.

A U shaped supporting section 23 having a pair of parallel side arms 24 and 25 connected together at one end thereof by a bight portion 26 is slidably and adjustably secured to the upstanding arm 16 for supporting the band saw on the table 11. One arm, as the side arm 24, of the supporting device 23 is slidably engaged with the upstanding arm 16 and the upstanding arm 16 is provided with an elongated opening 27 along the length thereof through which horizontal bolts 28 are extended, the bolts 28 being threaded in openings formed in the arm 24 of the U shaped support. A laterally extended lug 29 having a threaded opening is formed integral with the upstanding arm 16 and a bearing 30 is fixedly connected to the arm 24 above the lug 29 for rotatably supporting a screw 31 therein to accomplish the positioning of the supporting device 23 in relation to the table 11 when and as desired. A knurled head 32 is fixed to or formed integral with the upper end of the screw 31 for rotating the screw 31 in the bearing 30 and within the lug 29, thereby adjusting the vertical position of the U shaped supporting section 23 when the band saw attachment 10 is being used.

The side arms 24 and 25 are secured together by horizontally extending braces 33 and 34 on the opposite sides of both of the side arms 24 and 25. The brace 33 is fixedly secured to the U shaped supporting section 23 and to the side arms 24 and 25 by rivets or bolts 35 and 36. The side brace 34 is pivotally connected at one end to the side arm 25 by means of the rivet 35 on the arm 25 and slidably engages the rivet or bolt 36 on the other arm 24 as clearly shown in Fig. 1 of the drawings. The brace 34 is provided with a slot 37 disposed inwardly from the lower edge of the brace 34 for receiving the bolt 36 in bracing engagement with the bolt 36.

A second wheel 38 is rotatably secured on the shaft 39 between the braces 33 and 34 and operates between the side arms 24 and 25 of the U shaped supporting section 23 below the bight 26. Suitable bearings may be provided for the axle 39 in each of the braces 33 and 34, intermediate the length of the braces, for the opposite ends of the axle 39. One end of the axle 39 is provided with a head 40 and the other end of the axle 39 is threaded exteriorly for threadedly receiving a nut 41 on one side of the wheel 38 and on one side of one of the braces, as the brace 34, so that the brace 34 may be loosened from the axle 39 for pivotal movement about its attaching rivet 35 when the wheel 38 is to be removed from the axle for the purposes to be more particularly described hereinafter.

The other side arm 25 of the supporting device 23, is provided with a body 42 for slidable movement along the length of the said arm 25 and the body 42 is provided with flanges 43 thereon extending along the length of the arm 25 for adjustment thereon. Each of the flanges 43 is provided with an elongated slot 44 spaced longitudinally of the flange above the body 42. Bolts 45 are threadedly engaged in the arm 25 and extend through the elongated slots 44 for securing the body 42 in a selected position along the length of the arm 25.

A guide wheel 46 is rotatably carried by the bracket 42', which is adjustable laterally with respect to the body 42, the wheel 46 operating at right angles to both of the wheels 13 and 38 and between said wheels and their arbors 12 and 39. The guide wheel 46 on the body 42 is rotatably secured on the body by a bolt 47 which extends through the slot 47' and through the center of the wheel 46 and is supplied with a wing nut 48 on the threaded end thereof. The bracket 42' also supports the spaced saw guide blocks 45' by means of the screws 46' that extend through slots 49' of the blocks and are positioned in threaded openings in the arm 24 for adjustment towards and away from each other to compensate for saws of various thicknesses.

When it is desired to convert the circular saw table to a band saw table, the band saw attachment 10 may be secured to the saw table 11 by engaging the clamp 17 with the edge of the table and then tightening the clamp screw 21.

The brace 34 is now loosened, by loosening the bolt 36, and then hinging the brace 34 about the hinge pin or rivet 35 so that the flexible band saw blade 14 may be engaged about the wheel 13, on the arbor 12, and the wheel 38 on the arbor 39 before the brace 34 is secured in its operative position. The brace 34 may then be secured by tightening the screw 36 in the top end of the elongated slot 37 and by tightening the nut 41 on the threaded end of the axle of the second wheel 38. The bolts 28 are loose at this time with the supporting arm 24 freely slidable along the length of the upstanding arm 16 and when the wheels 38 and 13 are moved to the desired position for tightening the saw band 14 to its desired tautness, the bolts 28 may be threadedly engaged with the arm 24 for securing the arm 24 in its selected position.

The guide roller 46 is then moved vertically on the other arm 25 in engagement with the free edge of the saw blade 14 about the wheels 13 and 38 and in its engagement with the non-cutting edge of the saw band 14.

While the specific details of one embodiment of this invention have been herein shown and described, the invention is not confined thereto as changes and alterations may be made without departing from the spirit and scope thereof as defined in the appended claims.

What is desired to be protected by Letters Patent is:

1. A band saw attachment for a saw table having a rotatable arbor and a wheel secured on said arbor comprising an upstanding member clampingly secured on said table, an inverted U shaped support adjustable on said member having one arm slidable along the length thereof, a saw band guide roller mounted on said member and adjustable along the length of the other arm of said support, an arcuate bight connecting said arms together, a second wheel rotatable between said arms and bight, an axle rotatable in said second wheel and extending beyond the opposite ends of said wheel, a brace fixed at the opposite ends thereof between said side arms on one side of said wheels, a second brace detachably connected at the opposite sides thereof to said side arms on the opposite side of said wheel, an axle bearing in each of said braces intermediate the length thereof for rotatably supporting the opposite ends of said axle, a band saw trained over said wheels and engaging said guide roller.

2. A saw attachment for a saw table having a rotatable power attached arbor and a wheel on said arbor comprising an upstanding arm clampingly secured to said table, an inverted U-shaped support having a pair of side arms, one arm of said support slidably engaging said upstanding arm, a guide roller on the other of said supporting arms, an arcuate bight connected between said arms, a second wheel rotatable between said supporting arms and below said bight, braces engageable at the opposite ends thereof with said supporting arms on the opposite side of said second wheel, a bearing on each of said braces intermediate the length thereof rotatably supporting said second wheel, a saw band engageable with each of said wheels and said guide roller, one of said braces being fixed to one of said supporting arms and the other of said braces pivoted on the other of said supporting arms.

References Cited in the file of this patent

UNITED STATES PATENTS

| 118,796 | Edson | Sept. 12, 1871 |
| 1,864,517 | Biro | June 28, 1932 |
| 2,627,288 | Steiner | Feb. 3, 1953 |

FOREIGN PATENTS

| 598 | Great Britain | Feb. 27, 1866 |
| 168,171 | Great Britain | Sept. 1, 1921 |
| 191,833 | Great Britain | Jan. 22, 1923 |
| 250,710 | Switzerland | June 16, 1948 |